United States Patent
Matsumoto

(10) Patent No.: US 10,612,591 B2
(45) Date of Patent: Apr. 7, 2020

(54) LINEAR GUIDE DEVICE

(71) Applicant: NSK Ltd., Shinagawa-ku, Tokyo (JP)

(72) Inventor: Jun Matsumoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/558,459

(22) PCT Filed: Mar. 17, 2016

(86) PCT No.: PCT/JP2016/001567
§ 371 (c)(1),
(2) Date: Sep. 14, 2017

(87) PCT Pub. No.: WO2016/152123
PCT Pub. Date: Sep. 29, 2016

(65) Prior Publication Data
US 2018/0066702 A1 Mar. 8, 2018

(30) Foreign Application Priority Data

Mar. 24, 2015 (JP) ................................. 2015-061187
Jan. 29, 2016 (JP) ................................. 2016-015243

(51) Int. Cl.
*F16C 29/08* (2006.01)
*F16C 29/06* (2006.01)
*F16J 15/00* (2006.01)

(52) U.S. Cl.
CPC ............ *F16C 29/088* (2013.01); *F16C 29/06* (2013.01); *F16C 29/084* (2013.01); *F16J 15/002* (2013.01)

(58) Field of Classification Search
CPC ............................ F16C 29/084; F16C 29/088
See application file for complete search history.

(56) References Cited

U.S. PATENT DOCUMENTS 5,358,336 A   10/1994 Agari
5,388,911 A *  2/1995 Agari .................... F16C 29/088
                                                        384/15

(Continued)

FOREIGN PATENT DOCUMENTS

CN    202971572 U    6/2013
JP    7-243443 A    9/1995

(Continued)

OTHER PUBLICATIONS

Taiwanese Office Action issued in counterpart Taiwanese Application No. 105109236 dated Jan. 16, 2018 with unverified English translation (11 pages).
Extended European Search Report issued in counterpart European Application No. 16768030.6 dated Feb. 12, 2018 (six pages).
International Preliminary Report on Patentability (PCT/IB/338 & PCT/IB/373) issued in PCT Application No. PCT/JP2016/001567 dated Oct. 5, 2017, including English translation of document C2 (Japanese-language Written Opinion (PCT/ISA/237)) previously filed on Sep. 14, 2017 (nine pages).

(Continued)

*Primary Examiner* — James Pilkington
(74) *Attorney, Agent, or Firm* — Crowell & Moring LLP

(57) ABSTRACT

To provide a linear guide device having a higher dustproof performance and a dustproof function with a higher degree of freedom. A linear guide device includes a guide rail, a slider, and a rolling element, a seal member which seals a gap formed between a side surface portion of the guide rail and an inner side surface portion of the slider. The seal member includes a first seal member provided at the inner side surface portion of the slider, and a second seal member which is larger in width than the first seal member and is provided in a bottom surface portion of a slider body to be independently detachable from the bottom surface portion, as superimposed on the first seal member.

7 Claims, 10 Drawing Sheets

(56) References Cited

U.S. PATENT DOCUMENTS

| | | | |
|---|---|---|---|
| 5,531,521 A | 7/1996 | Ochiai et al. | |
| 6,217,217 B1 | 4/2001 | Teramachi | |
| 6,626,572 B2 | 9/2003 | Teramachi | |
| 2001/0016088 A1 | 8/2001 | Teramachi | |
| 2009/0310892 A1 | 12/2009 | Chen et al. | |
| 2012/0073396 A1 | 3/2012 | Kawaguchi et al. | |
| 2013/0142458 A1 | 6/2013 | Nakagawa | |
| 2014/0219587 A1* | 8/2014 | Nakagawa | F16C 29/0666 384/15 |
| 2014/0294327 A1* | 10/2014 | Yoshida | F16C 29/0609 384/15 |

FOREIGN PATENT DOCUMENTS

| | | | |
|---|---|---|---|
| JP | 9-303390 A | | 11/1997 |
| JP | 2000-18244 A | | 1/2000 |
| JP | 20239174 | * | 2/2002 |
| JP | 2007-211821 A | | 8/2007 |
| JP | 2008-215540 A | | 9/2008 |
| JP | 4640306 | * | 3/2011 |
| JP | 2012-41986 A | | 3/2012 |
| JP | 2014-219025 A | | 11/2014 |
| TW | 483991 | | 4/2002 |
| WO | WO 2014/178302 A1 | | 11/2014 |

OTHER PUBLICATIONS

International Search Report (PCT/ISA/210) issued in PCT Application No. PCT/JP2016/001567 dated Jun. 21, 2016 with English translation (five pages).
Japanese-language Written Opinion (PCT/ISA/237) issued in PCT Application No. PCT/JP2016/001567 dated Jun. 21, 2016 (five pages).
Chinese-language Office Action issued in counterpart Chinese Application No. 201680017283.8 dated Aug. 22, 2018 with partial English translation (nine (9) pages).
Korean-language Office Action issued in counterpart Korean Application No. 10-2017-7022575 dated Aug. 1, 2019 with English translation (six (6) pages).
Korean-language Decision of Rejection for Amendment issued in counterpart Korean Application No. 10-2017-7022575 dated Aug. 1, 2019 with English translation (four (4) pages).
Communication pursuant to Article 94(3) EPC issued in counterpart European Application No. 16 768 030.5 dated Sep. 12, 2019 (six (6) pages).

* cited by examiner

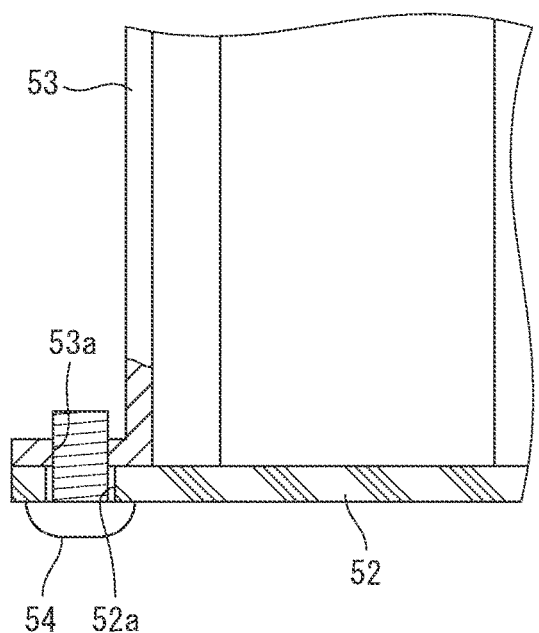
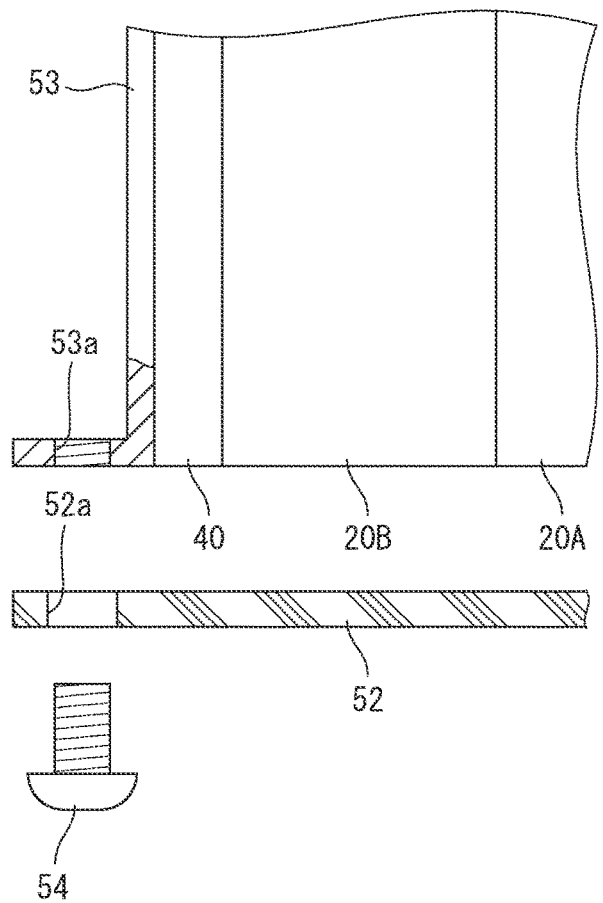
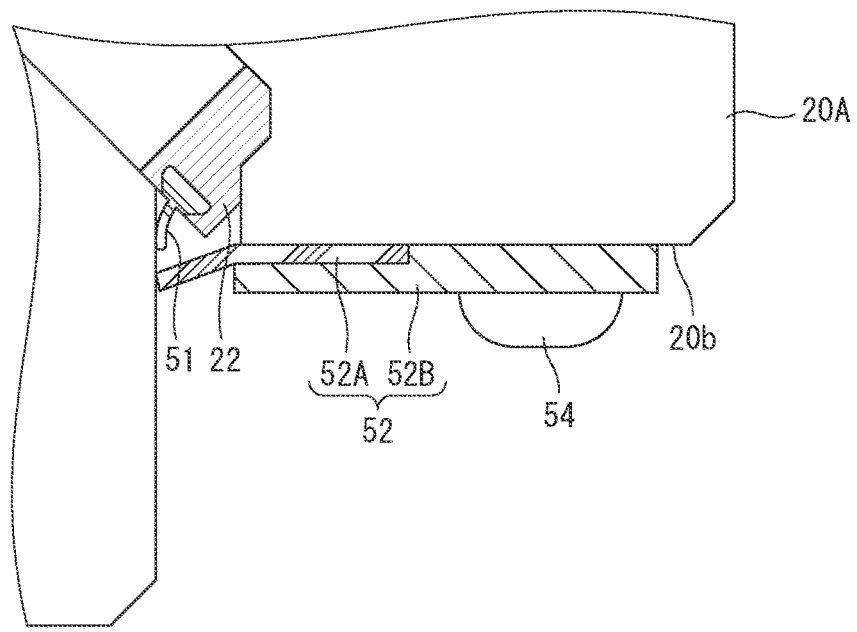

LINEAR GUIDE DEVICE

TECHNICAL FIELD

The present invention relates to a linear guide device used for a machine tool or the like.

BACKGROUND ART

Conventionally, a linear guide device used for a machine tool or the like generally includes a guide rail having rolling element orbital surfaces in its left and right side surface portions, a slider having in its inner side surface portions, rolling element orbital surfaces respectively facing the rolling element orbital surfaces of the guide rail, and multiple rolling elements which roll upon the relative linear motion of the slider or the guide rail in linear rolling element rolling paths formed between the rolling element orbital surfaces of the guide rail and the slider.

Upon rolling in the rolling element rolling paths, the rolling elements change their directions in end caps attached to the two ends of the slider in the front-to-rear direction, and then return to the original positions through rolling element return paths formed in the slider.

In such a linear guide device, when foreign particles such as dust enter the rolling element rolling paths from the gaps between the side surface portions of the guide rail and the inner side surface portions of the slider, the rolling motion of the rolling element is disturbed, leading to considerable degradation in travelling performance of the slider. Under the circumstances, a linear guide device including a seal which prevents foreign particles such as dust from entering the rolling element rolling paths from the gaps between the side surface portions of a guide rail and the inner side surface portions of a slider has been proposed (see PTLs 1 and 2).

PTL 1 discloses a linear guide device including a seal formed on the bottom surface of the slider to prevent foreign particles such as dust from entering the rolling element rolling paths.

However, in the structure of the seal disclosed in PTL 1, the dustproof performance of the rolling element rolling paths may be insufficient, depending on the environment under which the linear guide device is used. To further enhance the dustproof performance in the rolling element rolling paths, a linear guide device with its dustproof performance reinforced by stacking bottom seals for the slider has been proposed, as in PTL 2.

CITATION LIST

Patent Literature

PTL 1: JP 2000-018244 A
PTL 2: JP 2007-211821 A

SUMMARY OF INVENTION

Technical Problem

Unfortunately, in the linear guide device disclosed in PTL 3, since the stacked bottom seals are integrally fixed to the slider, the degree of freedom of adjustment for reinforcing or mitigating the dustproof function in accordance with the quantity of foreign particles in the surrounding environment remains to be improved.

The present invention has been made in view of the above-described issue, and has as its object to provide a linear guide device having a higher dustproof performance and a dustproof function with a higher degree of freedom.

Solution to Problem

In order to achieve the object mentioned above, according to an aspect of the present invention, there is provided a linear guide device including: a guide rail; a slider which moves relative to the guide rail; and a rolling element, the guide rail including a guide rail orbital surface formed in a side surface portion of the guide rail in a longitudinal direction of the guide rail, the slider including a slider body including a slider orbital surface formed to face the guide rail orbital surface, and a pair of end caps provided at two ends of the slider body in a movement direction, the linear guide device further including a seal member which seals a gap formed between the side surface portion of the guide rail and an inner side surface portion of the slider, and the seal member including a first seal member, and a second seal member which is larger in width than the first seal member and is provided in a bottom surface portion of the slider to be independently detachable from the bottom surface portion, as superimposed on the first seal member.

Advantageous Effects of Invention

According to an aspect of the present invention, a linear guide device having a higher dustproof performance and a dustproof function with a higher degree of freedom is provided.

BRIEF DESCRIPTION OF DRAWINGS

FIGS. 8A and 8B illustrate sectional views of the main part in certain modes of connection between a slider and the second seal member in the first embodiment of the linear guide device, in which FIG. 8A illustrates a state where the second seal member is attached to the slider, and FIG. 8B illustrates a state where the second seal member is detached from the slider;

FIG. 9 is an enlarged view of the main part illustrating an arrangement in a Modification to the first embodiment of the linear guide device;

FIGS. 10A to 10C illustrate views of the arrangements of a transport device to which the linear guide device according to the first embodiment is applied, in which FIG. 10A is a plan view, FIG. 10B is a front view, and FIG. 10C is an enlarged view of FIG. 10B;

FIGS. 13A and 13B illustrate sectional views of the main part in certain modes of connection between a slider and a second seal member in the second embodiment of the linear guide device, in which FIG. 13A illustrates a state where the second seal member is attached to the slider, and FIG. 13B illustrates a state where the second seal member is detached from the slider.

DESCRIPTION OF EMBODIMENTS

Various specifics will be described in detail below to provide a complete understanding of embodiments of the present invention. However, it will be apparent that at least one embodiment can be carried out without such specific details.

Embodiments of linear guide devices will now be described with reference to the drawings.

(First Embodiment)
<Arrangement of Linear Guide Device>

Figure 1:
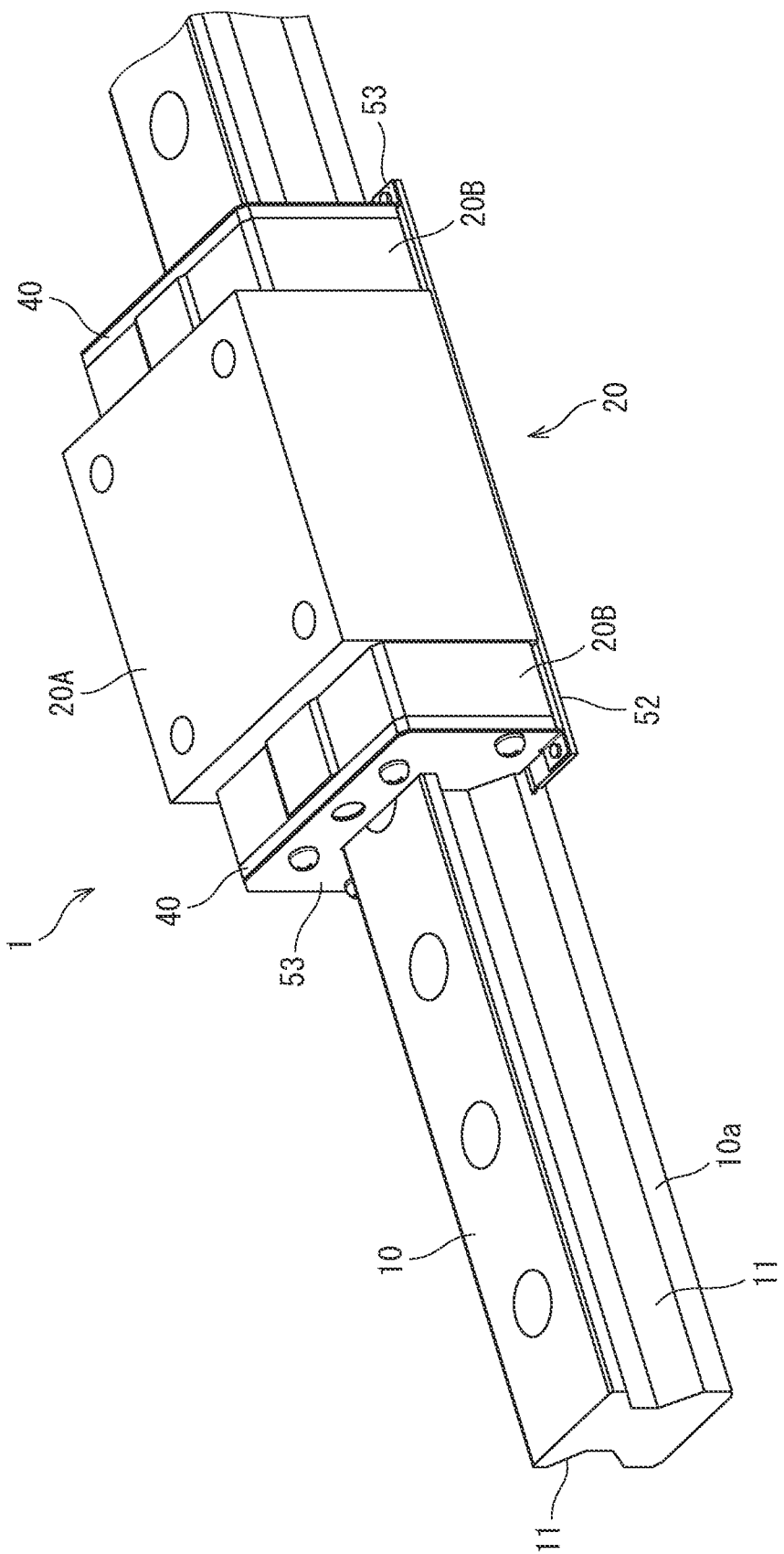
FIG. 1 is a perspective view illustrating an arrangement in a first embodiment of a linear guide device.
Figure 2:
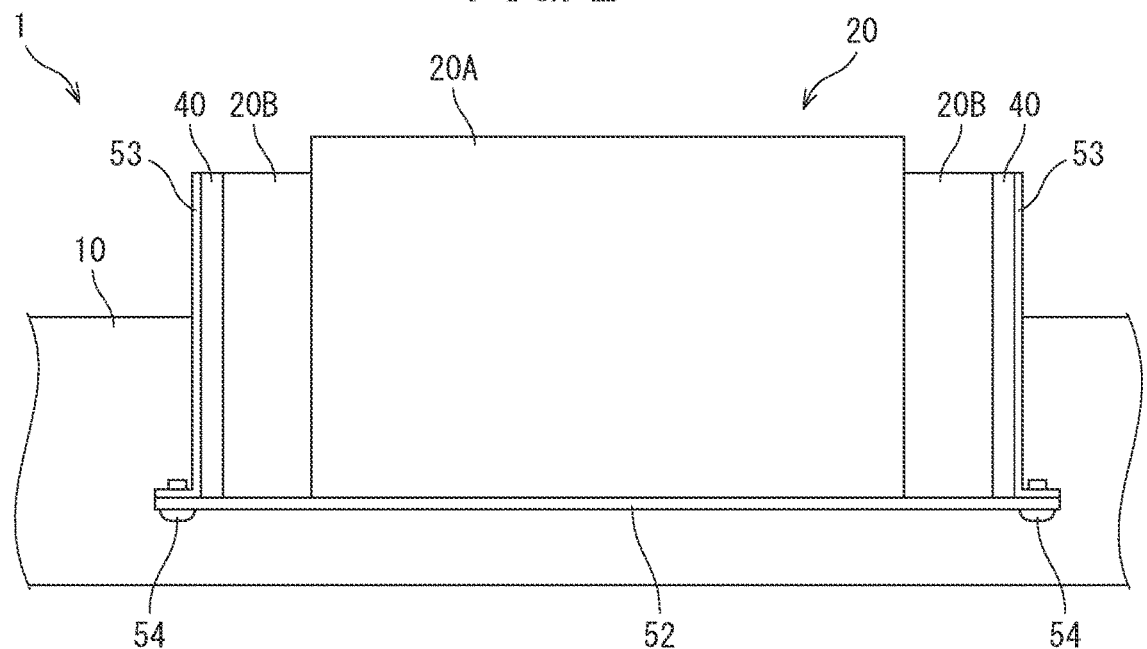
FIG. 2 is a side view illustrating the arrangement in the first embodiment of the linear guide device.
Figure 3:
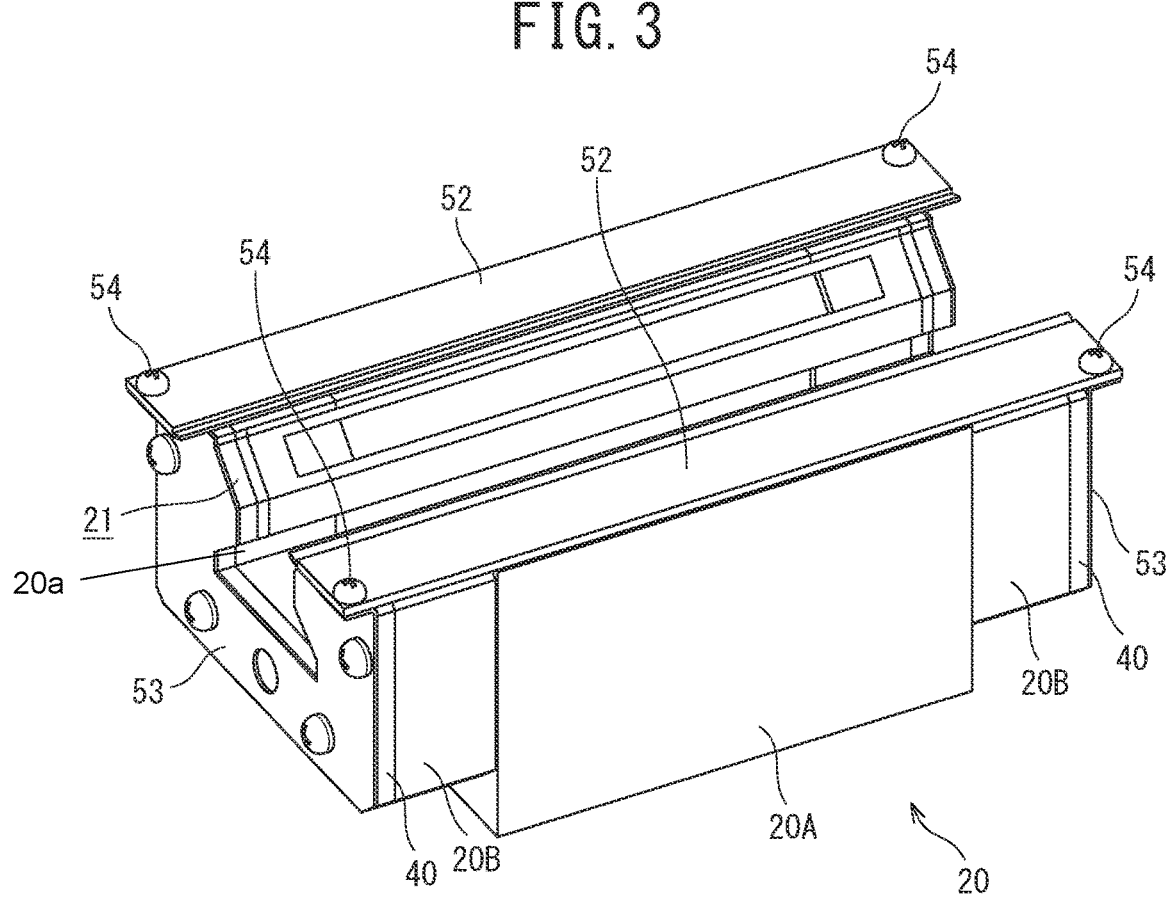
FIG. 3 is a perspective view illustrating the arrangement in the first embodiment of the linear guide device.

A linear guide device 1 according to this embodiment includes a guide rail 10, a slider 20 which moves relative to the guide rail 10, and rolling elements 30 (see FIG. 5), as illustrated in FIGS. 1 and 2.

Two guide rail orbital surfaces 11 are formed in side surface portions 10a of the guide rail 10 in the longitudinal direction of the guide rail 10.

The slider 20 includes a slider body 20A, and a pair of end caps 20B provided at the two ends of the slider body 20A in the movement direction (longitudinal direction). The slider body 20A and the end caps 20B straddle the guide rail 10, with their cross-sections both U-shaped. Two slider orbital surfaces 21 are formed on inner side surfaces 20a of the slider body 20A to face the guide rail orbital surfaces 11.

Figure 5:
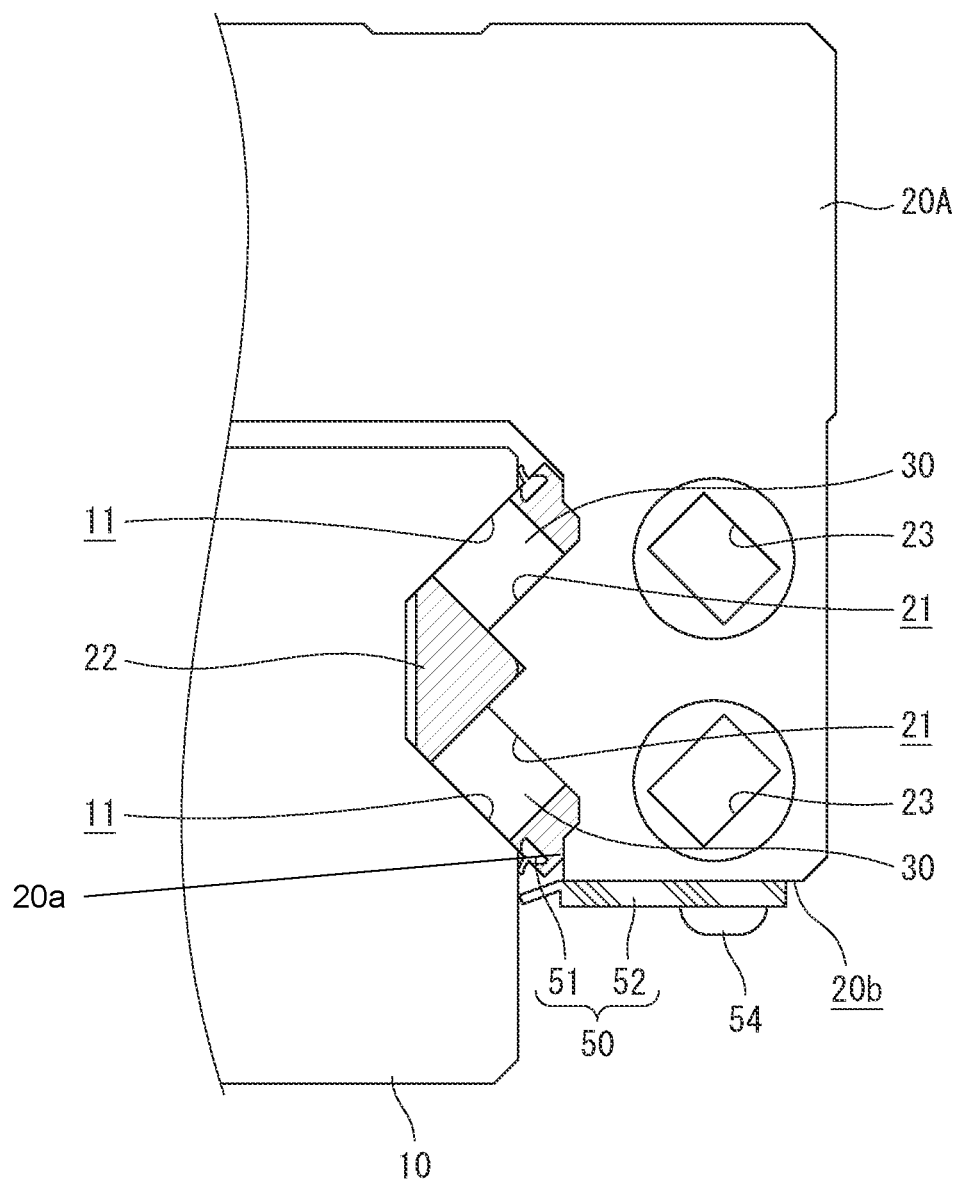
FIG. 5 is a sectional view illustrating the arrangement in the first embodiment of the linear guide device, taken in the widthwise direction.

As illustrated in FIG. 5, the slider 20 includes a retainer 22 which retains on the orbital surface side of the slider body 20A, the rolling elements 30 that roll upon the linear motion of the slider 20 relative to the guide rail 10 in orbits formed between the slider orbital surfaces 21 and the guide rail orbital surfaces 11.

Again as illustrated in FIG. 5, the rolling elements 30 are formed in, for example, a cylindrical roller shape and, upon rolling in the orbits, change their directions in the end caps 20B provided at the two ends of the slider body 20A in the longitudinal direction, and then return to the original positions through rolling element return paths 23 formed in the slider body 20A.

[Seal Member]

The linear guide device 1 according to this embodiment includes a seal member 50 which seals the gaps formed between the side surface portions 10a of the guide rail 10 and the inner side surfaces 20a of the slider 20 (slider body 20A).

Figure 4:
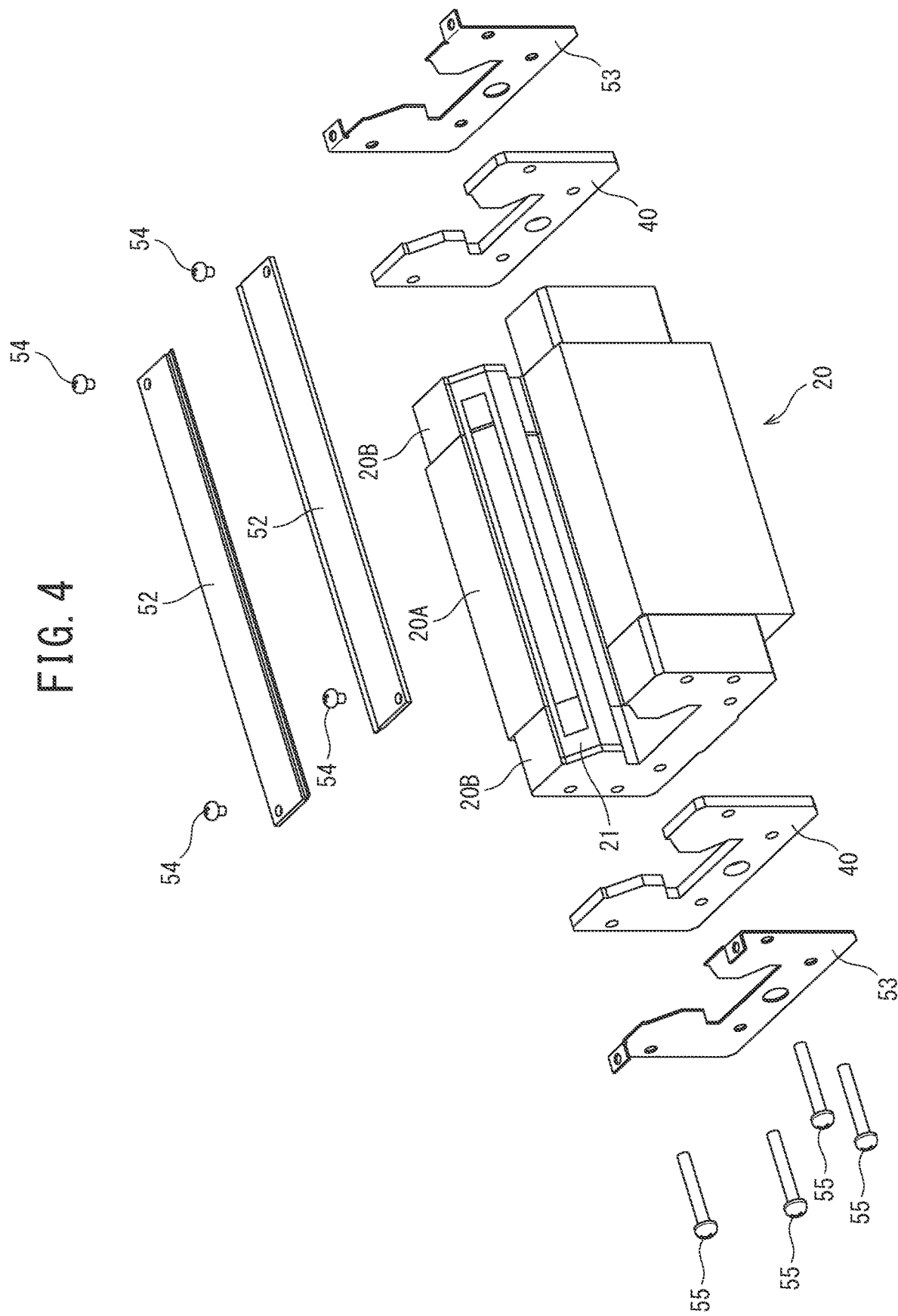
FIG. 4 is an exploded perspective view illustrating the arrangement in the first embodiment of the linear guide device.

The seal member 50 includes a first seal member 51 provided in the retainer 22, and a second seal member 52 provided in a bottom surface portion 20b of the slider body 20A, as illustrated in FIGS. 4 and 5.

[Second Seal Member]

The second seal member 52 projects from the two ends of the slider 20 in the longitudinal direction. The second seal member 52 is detachably provided in the bottom surface portion 20b, independently of the first seal member 51. The width of the second seal member 52 is set larger than that of the first seal member 51. The second seal member 52 is superimposed on the first seal member 51 in the direction of height (the direction in which the slider body 20A straddles the guide rail 10). Arranging the first seal member 51 and the second seal member 52 in this way improves the dustproof performance.

The second seal member 52 may be provided in each or either bottom surface portion 20b of the slider body 20A. The second seal member 52 may even be directly provided in the bottom surface portion 20b of the slider body 20A.

Figure 7:
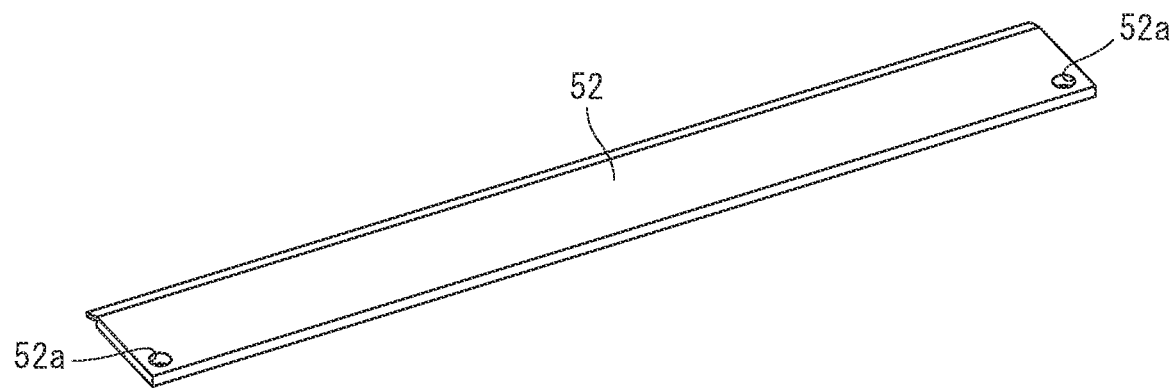
FIG. 7 is a perspective view illustrating the arrangement of a second seal member in the first embodiment of the linear guide device.

A plurality of through holes 52a are formed near the two ends of the second seal member 52 to extend in the direction of thickness, as illustrated in FIG. 7. The second seal member 52 is manufactured by integrally molding a soft material such as rubber or an elastomer into a metal plate such as a steel or stainless material or an aluminum alloy. The second seal member 52 may even be manufactured by injection molding of a single material such as an elastomer.

As the rubber used for the second seal member 52, synthetic rubber is suitable, such as nitrile rubber, hydrogenated nitrile rubber, acrylic rubber, silicone rubber, or fluoro rubber. As the elastomer, a thermoplastic elastomer is suitable, such as a polyester elastomer or a urethane elastomer.

The following description of this embodiment is related to the mode in which the second seal member 52 is provided on the slider 20 through mount plates 53 located at the two ends of the slider 20.

As illustrated in FIGS. 1 to 4 and 6, mount plates 53 are located at the two ends of the slider 20. The mount plates 53 are fastened to the end caps 20B of the slider 20 with side seals 40 by way of screws or the like. The second seal member 52 is further fastened to the mount plate 53 with screws 54.

[Mount Plate]

Figure 6:
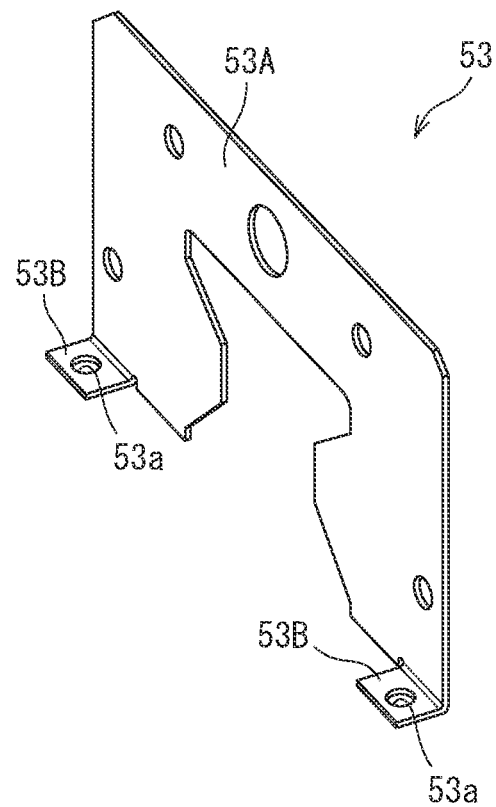
FIG. 6 is a perspective view illustrating the arrangement of a mount plate in the first embodiment of the linear guide device.

The mount plate 53 includes a main body 53A having nearly the same shape as the cross-sectional shape of the slider body 20A or the end cap 20B, and projections 53B which are formed to be continuous with the main body 53A in portions set at the bottom of the slider 20 and project outwards in the longitudinal direction of the slider 20, as illustrated in FIG. 6. The projections 53B include screw holes 53a. The second seal member 52 is fastened with screws through the screw holes 53a.

The inner peripheral portion of the mount plate 53 abuts against the outer peripheral surface of the guide rail 10 with a slight spacing from the guide rail 10. With this structure, the mount plate 53 also serves as a protector which removes large foreign particles. The mount plate 53 is manufactured by sheeting a metal plate such as ordinary steel, a stainless material, or an aluminum alloy. Therefore, the mount plate 53 has less risk of damage even when foreign particles that are hard at high temperatures, such as cuttings, come into contact with it.

The second seal member 52 is fastened to the mount plate 53 with the screws 54 inserted into the screw holes 52a at the two ends of the second seal member 52 and the screw holes 53a in the mount plate 53, as illustrated in FIGS. 8A and 8B.

The width (in the direction in which the slider orbital surfaces 21 of the slider 20 face each other) of the second seal member 52 is larger than that of the first seal member 51.

The members (through holes 52a and screw holes 53a) for fastening the mount plate 53 to the slider 20 are placed outside the range in which the first seal member 51 is located in the longitudinal direction, as described earlier.

With such a placement, an arrangement including a second seal member 52 fastened independently of a first seal member 51 can be easily implemented. For example, since the second seal member 52 is larger in length than the first seal member 51, a member for fastening the second seal member 52 can be placed in the extension. Further, since the second seal member 52 is larger in width than the first seal member 51, the first seal member 51 can be completely covered with the second seal member 52, thus producing a great dustproof effect.

In this embodiment, the second seal member 52 is indirectly fastened to the slider 20 only by the mount plates 53. This obviates the need for processing such as the formation of holes for fastening to the slider 20.

(Modification)

As a Modification to this embodiment, the second seal member 52 may include a lip member 52A which projects to the guide rail 10, and a holding member 52B which fixes the lip member 52A, as illustrated in FIG. 9. In this case, the lip member 52A is made of a soft material such as rubber or an elastomer, and the holding member 52B is made of a hard material such as a metal material such as a steel or stainless material or an aluminum alloy, or a synthetic resin such as polyamide or polyacetal. The surface with which the lip member 52A, the slider body 20A, and the holding member 52B come into contact with one another may be sealed where necessary, using, for example, a liquid gasket ("Liquid Gasket" available from, for example, ThreeBond Co., Ltd.). This can effectively prevent entrance of foreign particles from the gaps between components.

As described above, the linear guide device 1 according to this embodiment includes a first seal member 51 and a second seal member 52 which are fastened by independent fastening members. Depending on the use environment, only the second seal member 52 can be detached. In other words, the linear guide device can be equipped with only side seals 40 and a first seal member 51 without mount plates 53 and a second seal member 52.

In this manner, according to this embodiment, the dustproof performance can be adjusted in accordance with the surrounding environment. In other words, it is freely possible to use only one seal member in any portion where the dustproof performance is unimportant and use double seal members in any portion where the dustproof performance is important. This can achieve a minimum necessary dustproof performance without unnecessarily increasing the cost.

[Application Example of Linear Guide Device]

Figure 10A:
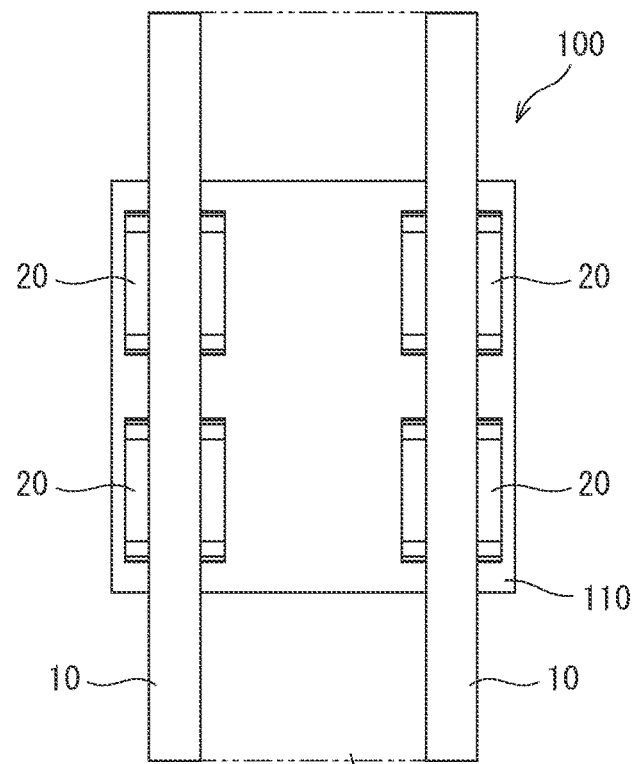
Figure 10B:
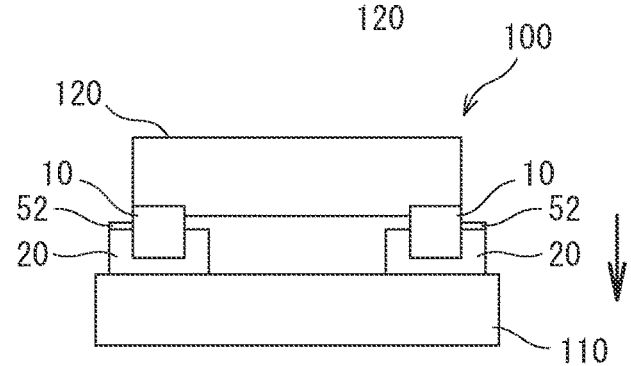
Figure 10C:
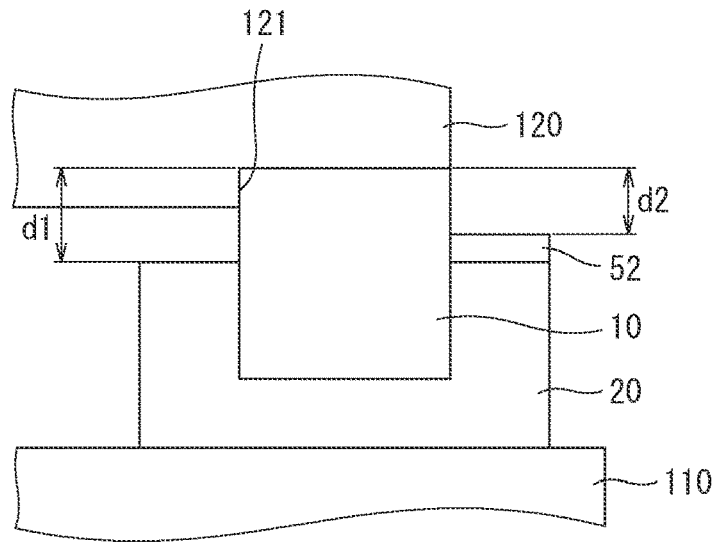

The linear guide device 1 according to this embodiment can be built into a transport device as illustrated in FIGS. 10A to 10C. In other words, two pairs of sliders 20 for the linear guide device 1 according to this embodiment are fixed to the upper surface of a base 110 of a transport device 100 in parallel, two guide rails 10 are mounted on the lower surface of a table 120, and the table 120 makes linear motion relative to the base 110. In the transport device 100, the table 120 is placed on the upper side and the base 110 is placed on the lower side with respect to the gravitational direction (indicated by an arrow). The guide rails 10 are accurately mounted on the table 120 to abut against steps, that is, shoulders 121 provided on the table 120.

When the transport device 100 is used, foreign particles such as dust may fall from above. Therefore, second seal members 52 may be mounted only on the exteriors of the sliders 20 arranged on the base 110 in parallel, as illustrated in FIG. 10C.

This means that the part on the side (the inner side in the widthwise direction) on which the shoulders 121 are present in the linear guide device 1 is covered with the table 120 from above, requires a low dustproof performance, and is not provided with second seal members 52.

With such an arrangement, a considerable height (d1) can be ensured from the bottom surfaces of the sliders 20 to the bottom surfaces of the guide rails 10. Since the shoulders 121 of the table 120 can hardly be interfered with, the degree of freedom of designing the transport device 100 increases. The part on the side on which the shoulders 121 are absent is not covered with the table 120 and requires dust proofing, and a second seal member 52 is mounted on the exterior of each slider 20 in the widthwise direction on the side on which the shoulders are absent. In the exterior of each slider 20 in the widthwise direction, the height (d2) from the bottom surface of the guide rail 10 to the bottom surface of the slider 20 is relatively low, but, because of the absence of the shoulders 121 in this part, no constraints are imposed on design of the transport device 100.

In this manner, even when the linear guide device 1 according to this embodiment is applied to a transport device, first seal members 51 and second seal members are independently fastened, and only the second seal member 52 on either the left or right side in the widthwise direction can be detached. In other words, an arrangement equipped with mount plates 53 as above without a second seal member 52 on one side can be obtained. This can provide a transport device capable of adjusting the dustproof performance in accordance with the surrounding environment. Even this transport device allows omission of only a bottom seal in any unnecessary portion and does not lead to an unnecessary increase in cost.

[Modification]

Figure 11:
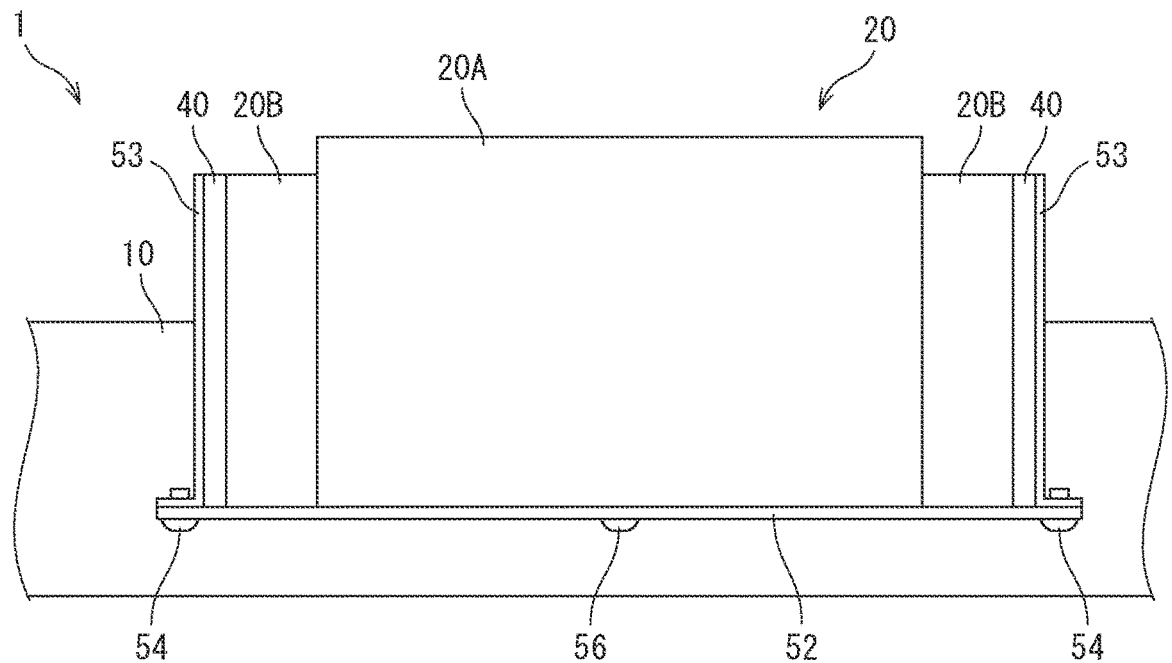
FIG. 11 is a side view illustrating an arrangement in another Modification to the first embodiment of the linear guide device.

In the linear guide device 1 according to this embodiment, a second seal member 52 may be fastened not only to the two ends of the slider 20 through the mount plates 53, but also to the slider body 20A with a screw 56 at the longitudinal central portion, as illustrated in FIG. 11. With such an arrangement, flexural deformation of the second seal member 52 can be prevented, thus producing a more stable dustproof effect.

(Second Embodiment)

A second embodiment of a linear guide device will be described next with reference to the drawings. Since this embodiment is different from the first embodiment only in terms of the arrangement mode of mount plates, a description of similar components denoted by the same reference numerals as in the above-described embodiment may be omitted.

Figure 12:
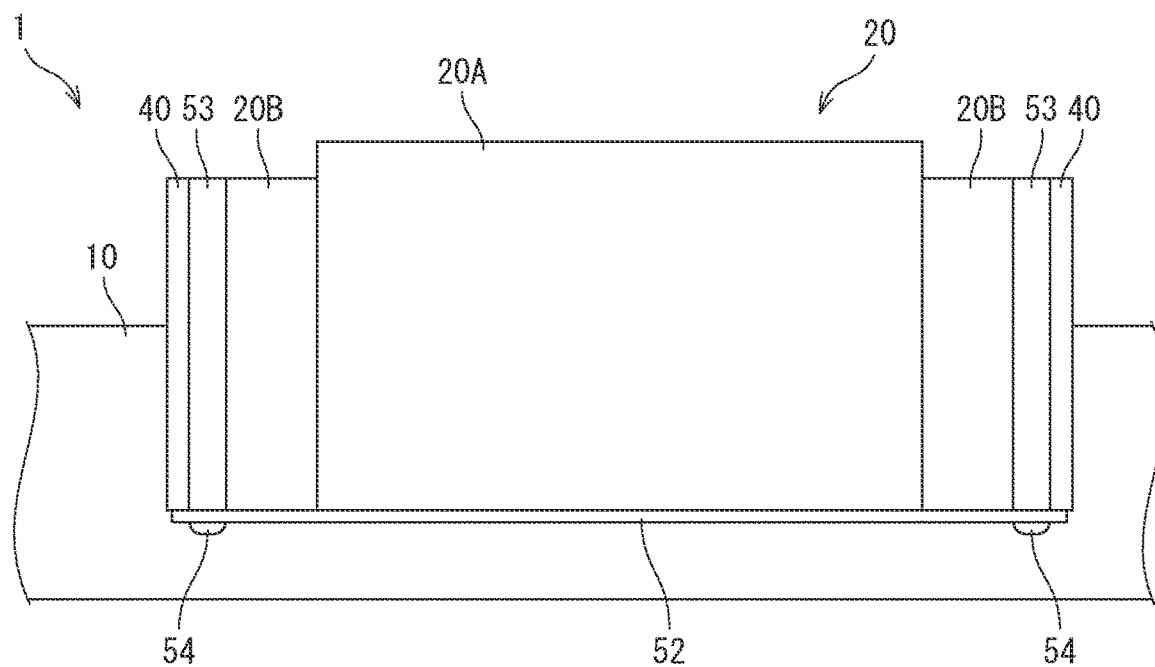
FIG. 12 is a side view illustrating an arrangement in a second embodiment of a linear guide device.
Figure 13A:
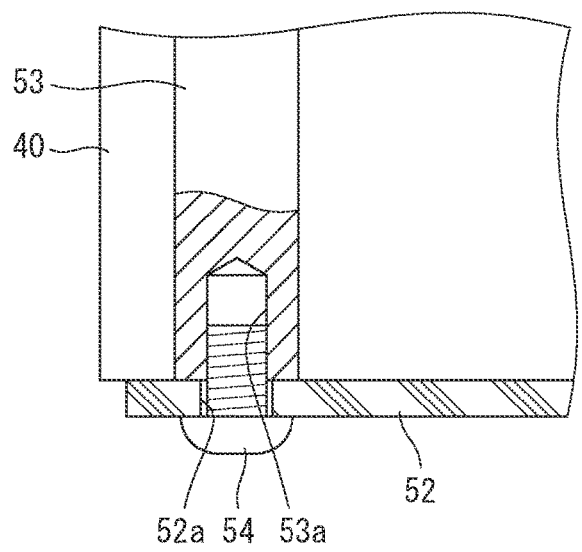
Figure 13B:
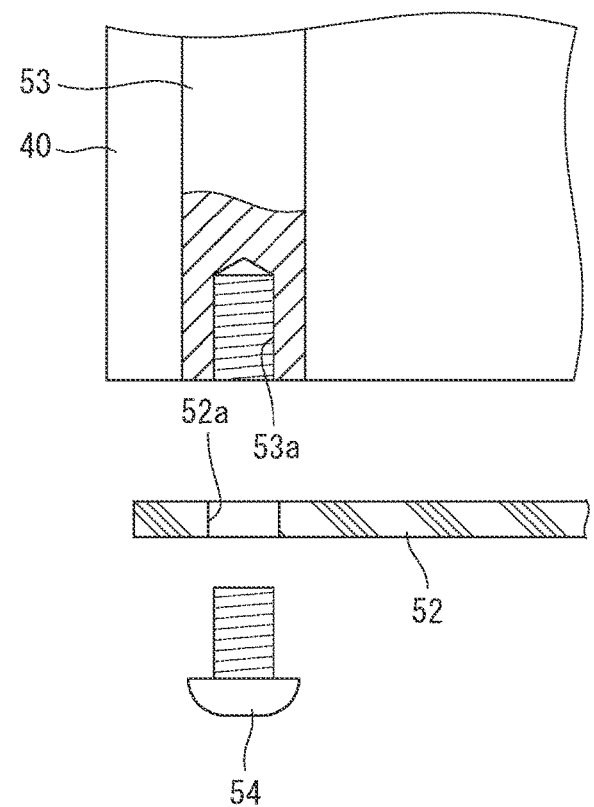

In the linear guide device according to this embodiment, mount plates 53 are interposed between end caps 20B and side seals 40, as illustrated in FIG. 12. In this embodiment, the mount plates 53 are preferably plate members made of a resin. A second seal member 52 is fastened by inserting screws 54 into through holes 52a formed at the two ends of the second seal member 52 and screw holes 53a formed in bottom surfaces 53B of the mount plates 53, as illustrated in FIGS. 13A and 13B.

According to this embodiment, the manufacturing cost can be reduced by manufacturing mount plates 53 using die injection molding. The front surfaces of the mount plates 53 are covered with the side seals 40 and are less exposed outside. Even in the presence of hard foreign particles, the mount plates 53 are less prone to damage.

(Third Embodiment)

A third embodiment of a linear guide device will be described next with reference to the drawings. Since this embodiment is different from the first embodiment in terms of the substitution of balls for cylindrical rollers as rolling elements and the arrangement mode of a seal member, a description of similar components denoted by the same reference numerals as in the above-described embodiment may be omitted.

Figure 14:
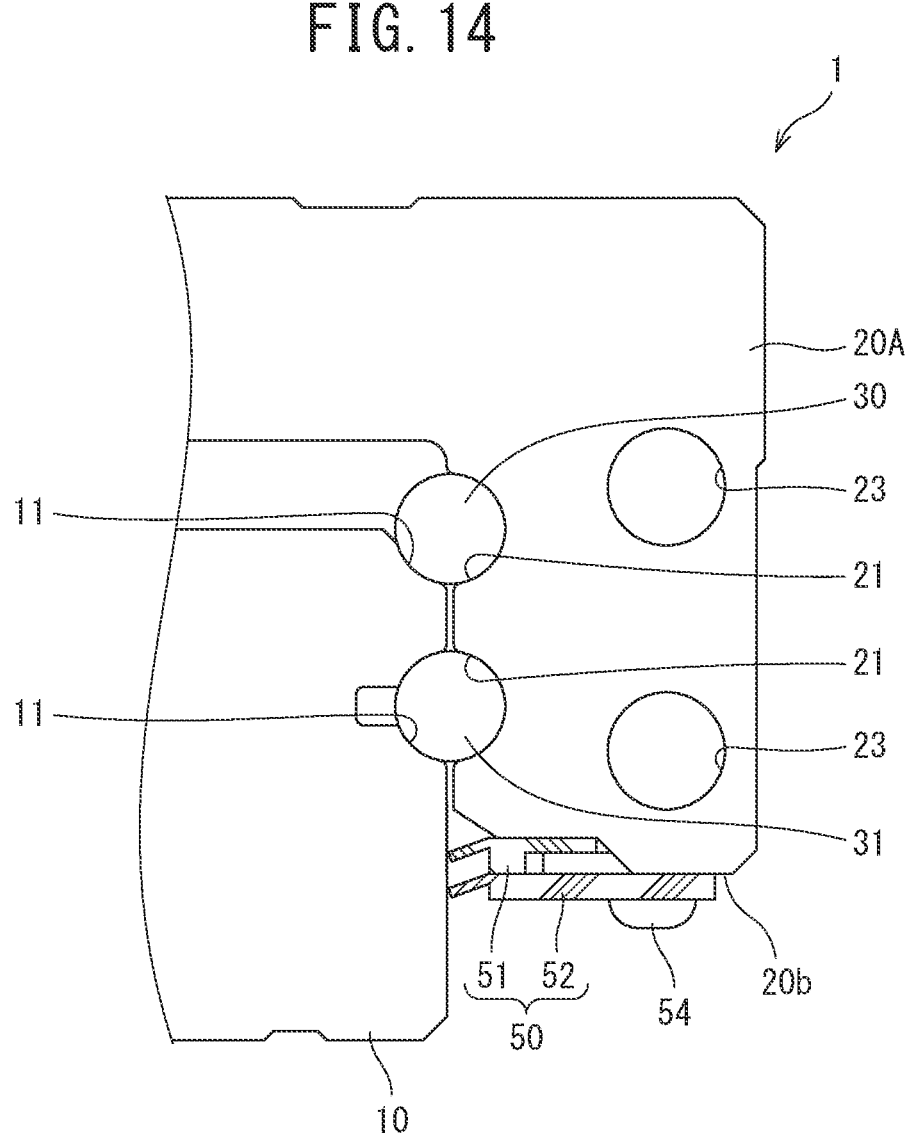
FIG. 14 is a front view illustrating an arrangement in a third embodiment of a linear guide device.

The same arrangement can be obtained even by using balls as rolling elements 30 to achieve the above-mentioned action and effect, as illustrated in FIG. 14. Like a second seal member 52, a first seal member 51 may be placed on a bottom surface portion 20*b* of a slider 20 and fastened to the slider 20 independently of the second seal member 52, again as illustrated in FIG. 14.

As described above, in the linear guide device according to the present invention, since a first seal member and a second seal member are superimposed on each other, the dustproof effect is great. In accordance with the quantity of foreign particles in the surrounding environment, only a first seal member or a set of a first seal member and a second seal member can be used as a seal member to adjust the dustproof performance. Hence, a linear guide device having a higher dustproof performance and a dustproof function with a higher degree of freedom can be provided.

The linear guide device according to this embodiment is suitable as linear guide devices used for general machines such as machine tools and transport devices.

While the present invention has been described above with reference to specific embodiments, the invention is not intended to be limited thereto. By referring to the description of the present invention, various modifications to the disclosed embodiments and other embodiments of the present invention are apparent to those skilled in the art. Accordingly, it should be understood that the scope of claims encompasses these modifications or embodiments that fall within the scope and spirit of the present invention.

The invention claimed is:

1. A linear guide device comprising:
a guide rail; a slider which moves relative to the guide rail; and a rolling element,
the guide rail including a guide rail orbital surface formed in a side surface portion of the guide rail in a longitudinal direction of the guide rail,
the slider including a slider body including a slider orbital surface formed to face the guide rail orbital surface, and a pair of end caps provided at two ends of the slider body in a movement direction, and a retainer that retains the rolling element on a side of the slider orbital surface,
the linear guide device further including a seal member which seals a gap formed between the side surface portion of the guide rail and an inner side surface portion of a bottom side of the slider,
the seal member including a first seal member, and a second seal member which is larger in width than the first seal member and is provided in a bottom surface of the slider to be independently detachable from the bottom surface, and is superimposed on the first seal member, the second seal member sliding in contact with the side surface portion of the guide rail, and
the first seal member being provided in an end portion of the retainer on the bottom side of the slider such that the first seal member is separated from the second seal member in a height direction and the first seal member slides in contact with the side surface portion of the guide rail adjacent to the guide rail orbital surface, in a direction perpendicular to the guide rail orbital surface and obliquely against the side surface portion.

2. The linear guide device according to claim 1, wherein the second seal member projects more in the longitudinal direction than the first seal member.

3. The linear guide device according to claim 1, wherein the second seal member is placed on only one bottom surface portion of two bottom surface portions of the slider in a widthwise direction.

4. The linear guide device according to claim 1, wherein a pair of mount plates respectively connected to two ends of the second seal member are provided at two ends of the slider in the movement direction.

5. The linear guide device according to claim 4, wherein the second seal member is fastened to a bottom surface portion of the slider body.

6. The linear guide device according to claim 4, wherein the mount plates are located outside side seals provided on end faces of the slider.

7. The linear guide device according to claim 4, wherein the mount plates are interposed between the end caps and side seals.

* * * * *